United States Patent [19]
Liberto

[11] Patent Number: 5,813,164
[45] Date of Patent: Sep. 29, 1998

[54] FISHING ROD HOLDER

[76] Inventor: Joseph Liberto, 1334 Sycamore Ave., Annapolis, Md. 21403

[21] Appl. No.: 927,340

[22] Filed: Sep. 11, 1997

[51] Int. Cl.⁶ .................................................. A01K 97/10
[52] U.S. Cl. ............................................................ 43/21.2
[58] Field of Search ............................. 43/21.2; 248/538; 211/70.8, 70.6; 224/922, 403; 114/343, 364

[56]  References Cited

U.S. PATENT DOCUMENTS

| | | |
|---|---|---|
| 4,901,469 | 2/1990 | Murray ...................................... 43/21.2 |
| 5,033,223 | 7/1991 | Minter ....................................... 43/21.2 |
| 5,435,093 | 7/1995 | Minorics et al. .......................... 43/21.2 |
| 5,460,306 | 10/1995 | Rudd ....................................... 224/557 |
| 5,673,507 | 10/1997 | Stokes, Jr. ................................ 43/21.2 |

*Primary Examiner*—Thomas Price

[57] ABSTRACT

A new fishing rod holder for transporting fishing rods in the load bed of a truck. The inventive device includes a support structure that is mountable to a vehicle such as a truck and a tubular rod holder member mounted to the support structure. The rod holder member is designed to hold the handle of a fishing rod.

12 Claims, 2 Drawing Sheets

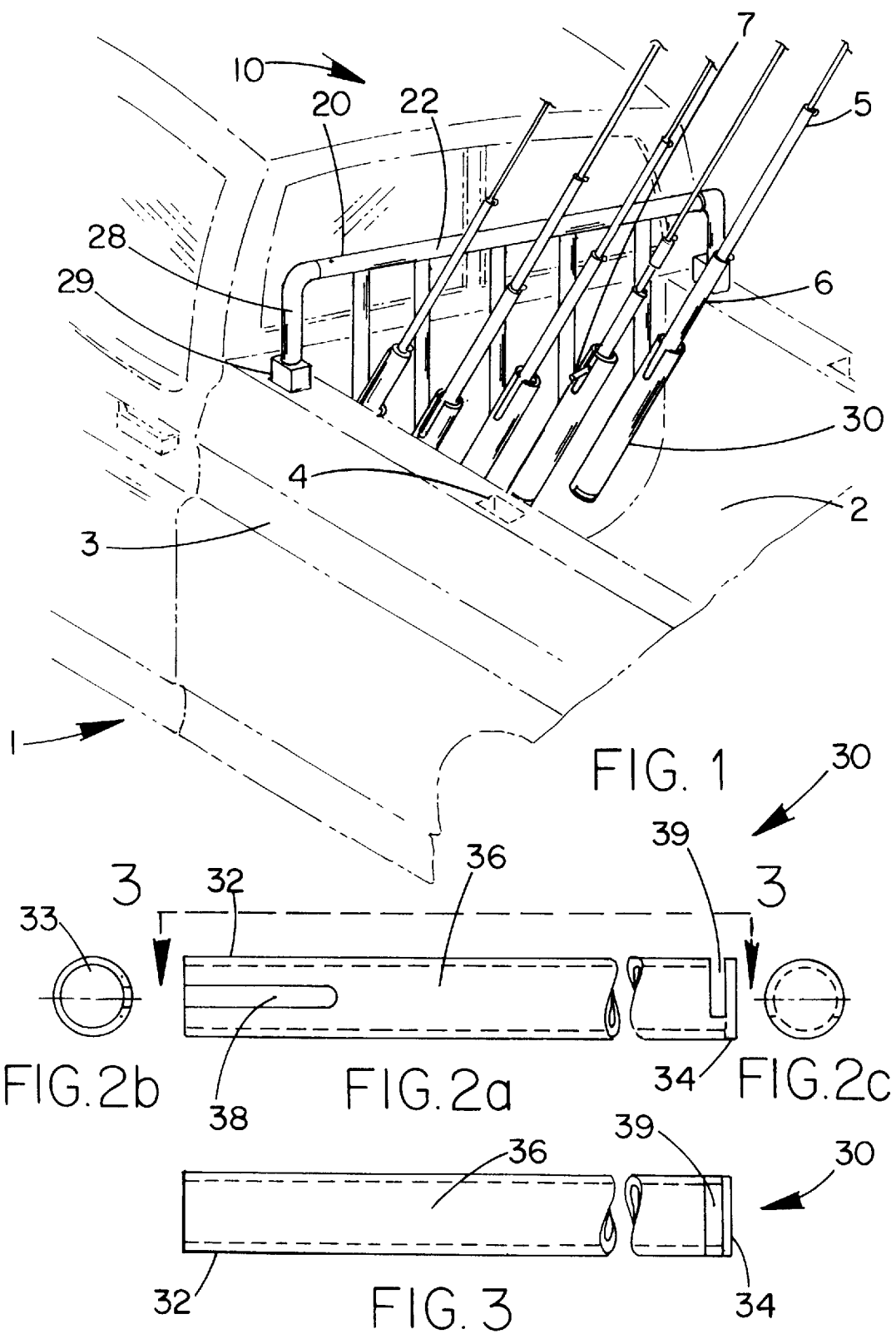

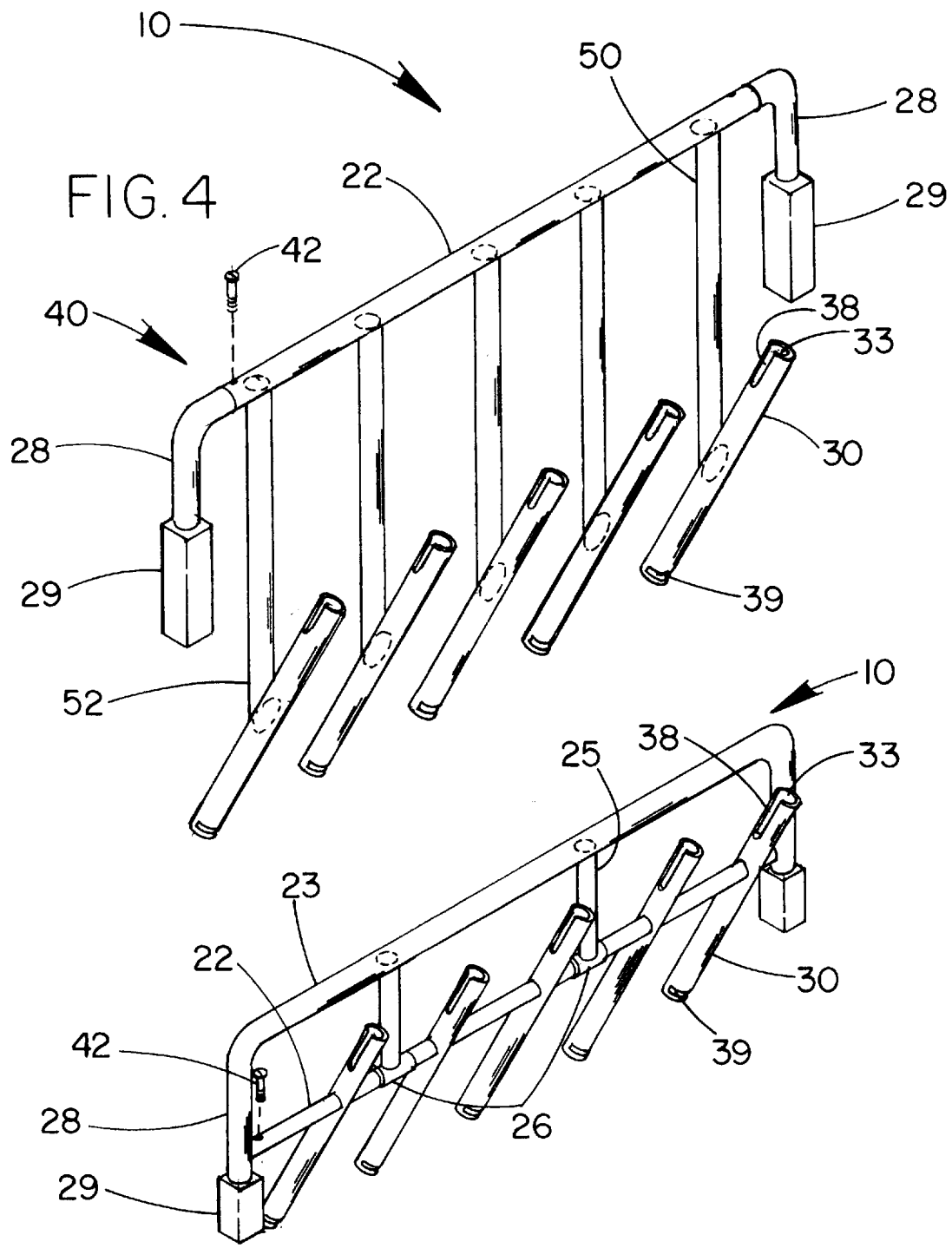

FISHING ROD HOLDER

BACKGROUND OF THE INVENTION

1. Field of the Invention

The present invention relates to fishing rod holders and more particularly pertains to a new fishing rod holder for transporting fishing rods in the load bed of a truck.

2. Description of the Prior Art

The use of fishing rod holders is known in the prior art. More specifically, fishing rod holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rod holders include U.S. Pat. No. 5,435,473; U.S. Pat. No. 4,097,017; U.S. Pat. No. Des. 303,003; U.S. Pat. No. 4,017,998; U.S. Pat. No. 4,881,674; and U.S. Pat. No. 4,696,122.

While these devices fulfill their respective, particular objectives and requirements, the aforementioned patents do not disclose a new fishing rod holder. The inventive device includes a support structure that is mountable to a vehicle such as a truck and a tubular rod holder member mounted to the support structure. The rod holder member is designed to hold the handle of a fishing rod.

In these respects, the fishing rod holder according to the present invention substantially departs from the conventional concepts and designs of the prior art, and in so doing provides an apparatus primarily developed for the purpose of transporting fishing rods in the load bed of a truck.

SUMMARY OF THE INVENTION

In view of the foregoing disadvantages inherent in the known types of fishing rod holders now present in the prior art, the present invention provides a new fishing rod holder construction wherein the same can be utilized for transporting fishing rods in the load bed of a truck.

The general purpose of the present invention, which will be described subsequently in greater detail, is to provide a new fishing rod holder apparatus and method which has many of the advantages of the fishing rod holders mentioned heretofore and many novel features that result in a new fishing rod holder which is not anticipated, rendered obvious, suggested, or even implied by any of the prior art fishing rod holders, either alone or in any combination thereof.

To attain this, the present invention generally comprises a support structure that is mountable to a vehicle such as a truck and a tubular rod holder member mounted to the support structure. The rod holder member is designed to hold the handle of a fishing rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new fishing rod holder apparatus and method which has many of the advantages of the fishing rod holders mentioned heretofore and many novel features that result in a new fishing rod holder which is not anticipated, rendered obvious, suggested, or even implied by any of the prior art fishing rod holders, either alone or in any combination thereof.

It is another object of the present invention to provide a new fishing rod holder which may be easily and efficiently manufactured and marketed.

It is a further object of the present invention to provide a new fishing rod holder which is of a durable and reliable construction.

An even further object of the present invention is to provide a new fishing rod holder which is susceptible of a low cost of manufacture with regard to both materials and labor, and which accordingly is then susceptible of low prices of sale to the consuming public, thereby making such fishing rod holder economically available to the buying public.

Still yet another object of the present invention is to provide a new fishing rod holder which provides in the apparatuses and methods of the prior art some of the advantages thereof, while simultaneously overcoming some of the disadvantages normally associated therewith.

Still another object of the present invention is to provide a new fishing rod holder for transporting fishing rods in the load bed of a truck.

Yet another object of the present invention is to provide a new fishing rod holder which includes a support structure that is mountable to a vehicle such as a truck and a tubular rod holder member mounted to the support structure. The rod holder member is designed to hold the handle of a fishing rod.

Still yet another object of the present invention is to provide a new fishing rod holder that provides a convenient means for transporting fishing rods.

Even still another object of the present invention is to provide a new fishing rod holder that protects fishing rods from damage caused by being tossed about during transportation by securely holding them in a safe, stationary position.

Even still yet another objective of the present invention is to provide a new fishing rod holder that has the ability to be positioned in the front and rear of a truck load bed, thereby allowing the user to fish with more than one line from a truck load bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new fishing rod holder according to the present invention.

FIG. 2a is a side view of the rod holder member of the present invention.

FIG. 2b is an end view of the upper end of the rod holder member of the present invention.

FIG. 2c is an end view of the lower end of the rod holder member of the present invention.

FIG. 3 is a side view of the rod holder member taken from line 3—3 of FIG. 2a.

FIG. 4 is a perspective view of the present invention with extension members included in the superstructure.

FIG. 5 is a perspective view of the present invention with a second horizontal member included in the superstructure.

DESCRIPTION OF THE PREFERRED EMBODIMENT

With reference now to the drawings, and in particular to FIGS. 1 through 5 thereof, a new fishing rod holder embodying the principles and concepts of the present invention and generally designated by the reference numeral 10 will be described.

As best illustrated in FIGS. 1 through 5, the fishing rod holder 10 comprises a support structure 20 and a tubular rod holder member 30 mounted to the support structure 20. The rod holder member 30 is designed to hold the handle 6 of a fishing rod 5.

As shown in FIG. 1, the support structure 20 of the fishing rod holder 10 is designed to for mounting to the side walls of a load bed 2 of a vehicle such as a truck 1. Preferably, the load bed 2 has two spaced apart side walls 3 each with a plurality of post holes 4.

The fishing rod holder support structure 20 generally includes a horizontal member 22 coupled to a mounting member 28. Preferably, the mounting member 28 has a mounting end 29 that is designed for insertion into the post hole 4 of a vehicle load bed side wall 3 to hold the fishing rod holder 10 in place. More preferably, the support structure 20 includes two spaced apart mounting members 28 with the horizontal member 22 being extended between them. Ideally, the two mounting members 28 are spaced apart such that the mounting member mounting ends 29 can be inserted into side wall post holes 4 located on opposite sides of the vehicle load bed 2, as seen in FIG. 1.

Preferably, the horizontal member 22 is rotatably mounted on the mounting member 28. A stop means 40 is designed to selectively hold the support structure horizontal member 22 against rotation in relation to the support structure mounting member 28. Ideally, as illustrated in FIG. 4, such a stop means 40 includes a retaining pin 42.

The rod holder member 30 is mounted on the horizontal member 22. The rod holder member 30 is preferably tubular in shape and has a hollow interior 36. The upper end 32 of the rod holder member 30 has an opening 33 that extends into the hollow interior 36. The opening 33 is designed to permit insertion of a fishing rod handle 6 into the hollow interior 36.

Extending from the opening 33 towards the lower end 34 of the rod holder member 30 is a reel stem slot 38. The reel stem slot 38 is designed for receiving a reel stem 7 of a fishing rod handle 6. In use, the reel stem slot 38 helps prevent a fishing rod 5 with a reel stem 7 from damage caused by rotation of the fishing rod 5 during transport in the rod holder member 30.

Preferably, the rod holder member 30 has a drain slot 39. Even more preferably, the drain slot 39 is positioned towards the rod holder member lower end 34. The drain slot 39 is designed to allow the drainage of fluids such as rainwater or water dripping off of a recently used fishing rod 5 from the rod holder member hollow interior 36. In use, the drain slot 39 helps protect the handle 6 of an inserted fishing rod 5 from water damage.

The rod holder member 30 is attached to the horizontal member 22 of the support structure 20. Preferably, a plurality of rod holder members 30 are attached to the horizontal member 22. With reference to FIG. 5, the rod holder member 30 may be mounted directly to the support structure horizontal member 22.

Optionally, as shown in FIG. 4, the rod holder member 30 may be connected to the horizontal member 22 by an elongate extension member 50 that extends from the horizontal member 22. Even more preferably, the extension member 50 downwardly depends from the horizontal member 22 so that the rod holder member 30 is positioned below the horizontal member 22.

Ideally, the rod holder member 30 extends at an oblique angle in relation to the longitudinal axis of the extension member 50. Even more ideally, the rod holder member 30 is attached to the lower end 52 of the extension member 50.

Also optionally, as seen in FIG. 5, an elongate second horizontal member 23 may be extended between the mounting members 28 to provide additional support to the support structure 20. In such an embodiment, the second horizontal member 23 is preferably substantially parallel in orientation to the first horizontal member 22.

Even more preferably, a support member 25 is extended between the first horizontal member 22 and the second horizontal member 23 to provide additional support. Ideally, the support member 25 is coupled to the first horizontal member 22 in such a way as to permit rotation of the first horizontal member 22. Even more ideally, the first horizontal member 22 extends through a ring 26 that is fixedly attached to an end of the support member 25.

In use, the fishing rod holder 10 is designed to hold fishing rods 5 during transportation in a vehicle such as a truck 1. The fishing rod holder is also designed to provide a means for fishing with more than one line from the load bed 2 of a truck 1.

In use, the horizontal member 22 may be rotated to place the rod holder member 30 in a position most practical for a user. For example, the horizontal member may be rotated so that a fishing rod inserted into a rod holder member may be positioned at various angles for transport and for fishing directly from the vehicle load bed 2.

The support structure mounting ends 29 may also be inserted into the load bed side wall post holes 4 near the front of the truck 1 for more preferable positioning of the fishing rod holder 10 during transport. The support structure mounting ends 29 may also be inserted in the side wall post holes 4 near the rear of the truck 1 for providing a more preferable position for fishing directly from the load bed 2 of the truck 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod holder for a vehicle having a load bed, said load bed having a pair of spaced apart side walls, each said side wall having a plurality of post holes in said top edge being included therein, said fishing rod holder comprising:

a support structure, said support structure including an elongate horizontal member for bridging across said load bed and having opposite ends, and a pair of mounting members mounted to the horizontal member at opposite ends of said horizontal member, each said mounting member having a mounting end, each said mounting end being adapted for insertion into one of said plurality of post holes on opposite side walls of said load bed;

an extension member having opposite first and second ends with the first end mounted to said horizontal member, said extension member depending from said horizontal member for positioning the second end of said extension member between said side walls of said load bed; and a tubular rod holder member being mounted on the second end of said extension member, said rod holder member being for holding a handle of a fishing rod, wherein the extension member is adapted to position the tubular rod holder between the side walls of the load bed below the top edges of the load bed to reduce the vertical height protrusion of a fishing rod mounted in said rod holder.

2. The fishing rod holder of claim 1, wherein said mounting ends each have a lower terminus, and wherein the terminus is located at a distance from said horizontal member which is less than a distance of the second end of said extension member from said horizontal member.

3. The fishing rod holder of claim 1, wherein said tubular rod holder member has a hollow interior, an upper end, a lower end, and a drain slot being extended into said rod holder member hollow interior, said drain slot being positioned towards said rod holder member lower end, said drain slot being for permitting fluid flow out of said rod holder member hollow interior.

4. The fishing rod holder of claim 3, wherein said rod holder member upper end has an opening being for insertion of a fishing rod handle therethrough into said rod holder member hollow interior.

5. The fishing rod holder of claim 4, wherein said rod holder member has a reel stem slot being extended from said rod holder member upper end opening towards said rod holder member lower end, said reel stem slot being for receiving a reel stem of a fishing rod handle inserted into said rod holder hollow interior.

6. The fishing rod holder of claim 1, wherein said horizontal member of said support structure is rotatable in relation to said mounting member of said support structure.

7. The fishing rod holder for a vehicle of claim 6, further comprising a stop means for selectively holding said support structure horizontal member against rotation in relation to said support structure mounting member.

8. The fishing rod holder of claim 1, comprising five extension members and five tubular rod holder members.

9. The fishing rod holder of claim 1, wherein said rod holder member is angled with respect to said extension member.

10. A fishing rod holder for a vehicle having a load bed, said load bed having a pair of spaced apart side walls, each of said pair of side wall having a plurality of post holes being included therein, said fishing rod holder comprising:

a support structure, said support structure including a first horizontal member, a second horizontal member, and a mounting member, said rod holder member being mounted on said first horizontal member, said mounting member having a mounting end, said mounting member mounting end being for insertion into a post hole of a vehicle load bed side wall;

at least two tubular rod holder members, each tubular rod holder member being mounted on said support structure, said rod holder member being for holding a handle of a fishing rod;

said first horizontal member being extended from said mounting member, said second horizontal member being extended from said mounting member, said first horizontal member being spaced apart from said second horizontal member, and said first horizontal member being substantially parallel to said second horizontal member;

said support structure further including a support member being extended between said first horizontal member and said second horizontal member, said support member being for helping provide additional support to said support structure; and said second horizontal member being adapted to pivot, and each said tubular rod holder member being mounted to said second horizontal member such that each said tubular rod holder member pivots with said second horizontal member.

11. The fishing rod holder of claim 10, wherein the end of said second horizontal member is mounted to said mounting member by a tubular mounting sleeve mounted to said mounting member and receiving an end of said second horizontal support member therein, said mounting sleeve having a locking screw threadedly mounted therein for bearing against said second horizontal member to selectively lock rotation of said second horizontal member relative to said mounting member.

12. In combination, a fishing rod holder and a vehicle, said vehicle having a load bed, said load bed having a pair of spaced apart side walls, each said side wall having a plurality of post holes being included therein, said fishing rod holder comprising:
a support structure being adapted to be mounted to said vehicle, said support structure including:
a pair of spaced apart mounting members, each said mounting member having a mounting end being for insertion into respective post holes of said vehicle;
an elongate first horizontal member being extended between said support structure mounting members, said support structure first horizontal member being rotatable in relation to said support structure mounting members;
an elongate second horizontal member being extended between said support structure mounting members, said support structure first horizontal member being spaced apart from said support structure second horizontal member, said support structure first horizontal member being substantially parallel to said support structure second horizontal member;
a support member being extended between said support structure first horizontal member and said support structure second horizontal member, said support member being for helping provide additional support to said support structure;
a stop means for selectively holding said support structure first horizontal member against rotation in relation to said support structure mounting member;
at least two tubular rod holder members being for holding a handle of a fishing rod, each said rod holder member having a hollow interior, an upper end, a lower end, and a drain slot being extended into said rod holder member hollow interior, said drain slot being positioned towards said rod holder member lower end, said drain slot being for permitting fluid flow out of said rod holder member hollow interior, said rod holder member upper end having an opening being for insertion of a fishing rod handle therethrough into said rod holder member hollow interior, said rod holder member having a reel stem slot being extended from said rod holder member upper end opening towards said rod holder member lower end, said reel stem slot being for receiving a reel stem of a fishing rod handle inserted into said rod holder hollow interior; and
wherein each said rod holder member is mounted on said first horizontal member.

* * * * *